(12) United States Patent
She (10) Patent No.: US 8,303,010 B2
(45) Date of Patent: Nov. 6, 2012

(54) VEHICLE INTERIOR TRIM PANEL

(75) Inventor: Yimin She, Framington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 190 days.

(21) Appl. No.: 12/945,484

(22) Filed: Nov. 12, 2010

(65) Prior Publication Data

US 2012/0119532 A1    May 17, 2012

(51) Int. Cl.
*B62D 39/00* (2006.01)
(52) U.S. Cl. ........................................ 296/1.08
(58) Field of Classification Search .................. 296/1.08, 296/193.06, 191, 39.1, 70, 187.05; 280/730.2; 264/27.1
See application file for complete search history.

(56) References Cited

U.S. PATENT DOCUMENTS

| | | | |
|---|---|---|---|
| 6,328,333 B1 | 12/2001 | Patel et al. | |
| 6,808,198 B2 | 10/2004 | Schneider et al. | |
| 7,445,233 B2 * | 11/2008 | McKimson | 280/730.2 |
| 7,578,521 B2 | 8/2009 | Downey et al. | |
| 7,581,749 B2 | 9/2009 | Robins | |
| 7,607,684 B2 | 10/2009 | Downey et al. | |
| 7,690,676 B2 | 4/2010 | Jaramillo et al. | |
| 7,766,370 B2 | 8/2010 | Putcha | |
| 7,766,377 B2 | 8/2010 | Downey et al. | |
| 7,784,818 B2 | 8/2010 | Downey et al. | |
| 7,793,972 B2 | 9/2010 | Downey | |
| 2009/0091103 A1 | 4/2009 | Zucal et al. | |

* cited by examiner

*Primary Examiner* — Lori Lyjak
(74) *Attorney, Agent, or Firm* — Global IP Counselors, LLP (57) ABSTRACT

A vehicle interior trim panel is provided with a main trim body and a tab. The main trim body releasably covers at least a portion of a pillar of a vehicle, and includes a pillar facing surface, a passenger compartment facing surface, a top end and a bottom end. The tab extends from the bottom end of the main trim body to a free end and is received in a vehicle component. The tab includes a first face corresponding to the pillar facing surface of the main trim body, a second face corresponding to the passenger compartment facing surface of the main trim body, a peripheral edge surrounding the first and second faces of the tab, and a retention member formed on the peripheral edge of the tab. The retention member retains the tab to the vehicle component while the main trim body is released from the pillar.

20 Claims, 10 Drawing Sheets

VEHICLE INTERIOR TRIM PANEL

BACKGROUND

1. Field of the Invention

The present invention generally relates to a vehicle interior trim panel of a vehicle body structure. More specifically, the present invention relates to a vehicle interior trim panel that is configured to be at least initially retained to a vehicle component when the vehicle interior trim panel releases from the vehicle pillar.

2. Background Information

The interior of the vehicle typically includes various vehicle interior trim panels that cover the vehicle body as well as other vehicle components disposed inside of the passenger cabin. These interior trim panels are often provided over the metal structural elements of the vehicle body to provide an attractive appearance. These interior trim panels sometimes include, for example, tabs that engage openings in other components to aid in securing the trim panel in a correct orientation over the vehicle body and/or the vehicle components disposed inside of the passenger cabin. Most vehicles now include one or more airbags that are installed under vehicle interior trim panels. Typically, an airbag includes inflatable member that when deployed creates a cushioning bag or cushioning curtain to protect a passenger or passengers during impact events. Airbags are sometimes installed in pillar structures within certain vehicles. For example, an airbag is sometimes installed in an A-pillar of the vehicle such that when the airbag inflates, a cushioning curtain is formed between the vehicle passenger and a door and/or a portion of an interior roof of the vehicle.

In addition, for vehicle A-pillars, the Side Impact New Car Assessment Program (SINCAP) standard now requires a curtain airbag on new vehicles to extend down a portion of the A-pillar. When an airbag is installed beneath a trim panel, the trim panel needs to easily release from the metal structural element of the vehicle body upon deployment of the airbag. Certain modifications have been made to the A-pillar trim panel to accommodate this extension of the airbag and to keep the trim panel from completely separating from the A-pillar upon deployment of the airbag. A common modification is the addition of a two-stage trim clip that remains clipped to the pillar while tethering the trim panel to the pillar, thus allowing the curtain airbag to deploy between the pillar and the trim panel. However, the two-stage trim clip is generally unable to maintain proper positioning of the trim panel.

SUMMARY

In view of the state of the known technology, one aspect of the present invention is directed to various features of a vehicle interior trim panel that releasably secures to a vehicle pillar and at least initially remains coupled to a vehicle component when the vehicle interior trim panel releases from the vehicle pillar. This vehicle interior trim panel is especially useful for a pillar with an airbag at least partially disposed beneath the vehicle interior trim panel so that the vehicle interior trim panel releases from the vehicle pillar upon deployment of the airbag but remains partially attached to a vehicle component.

In order to carry out this aspect of the present invention, a vehicle interior trim panel is provided that mainly comprises a main trim body and a tab. The main trim body is configured to releasably cover at least a portion of a pillar of a vehicle, and includes a pillar facing surface, a passenger compartment facing surface, a top end and a bottom end. The tab extends from the bottom end of the main trim body to a free end and is configured to be received in a vehicle component. The tab includes a first face corresponding to the pillar facing surface of the main trim body, a second face corresponding to the passenger compartment facing surface of the main trim body, a peripheral edge surrounding the first and second faces of the tab, and a retention member formed on the peripheral edge of the tab. The retention member is configured to retain the tab to the vehicle component while the main trim body is released from the pillar.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
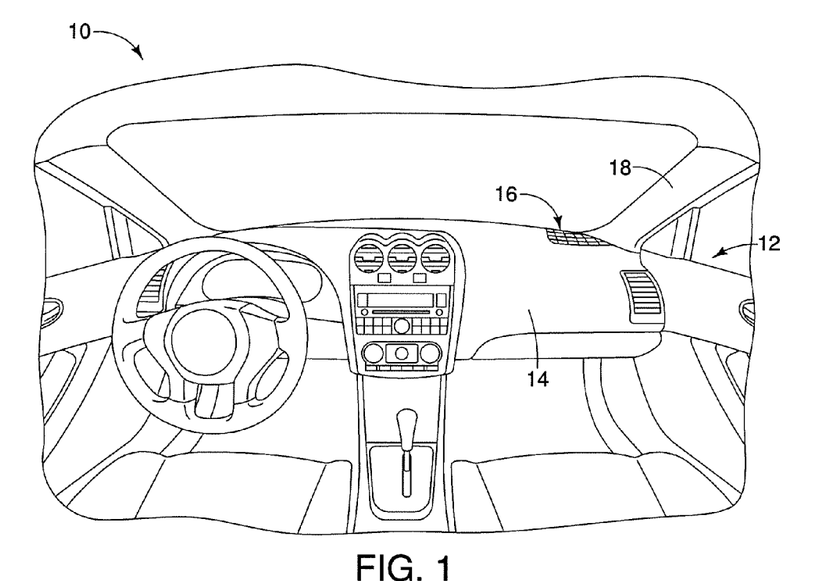
FIG. 1 is a perspective view of an interior portion of a vehicle that has a vehicle body structure with a vehicle interior trim panel releasably secured to a vehicle pillar in accordance with an illustrated embodiment.
Figure 2:
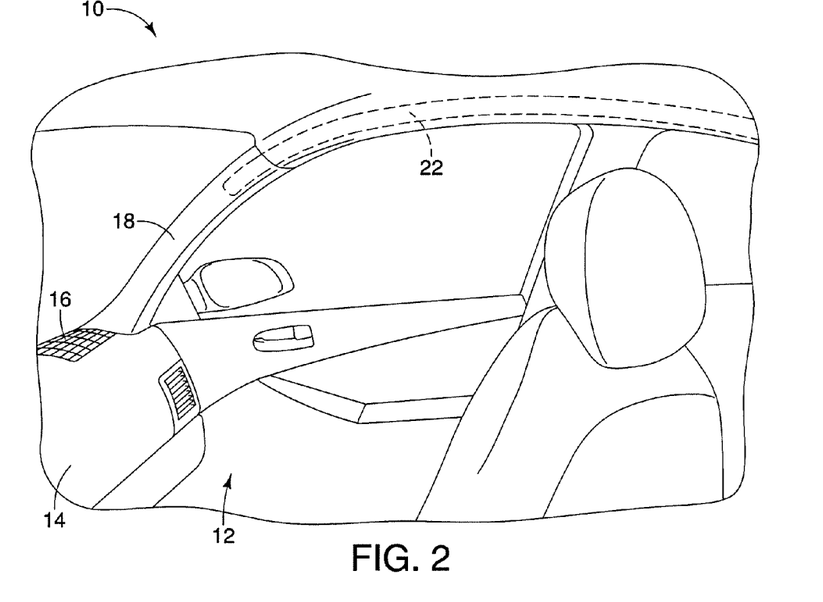
FIG. 2 is another perspective view of the interior portion of the vehicle shown in FIG. 1.
Figure 3:
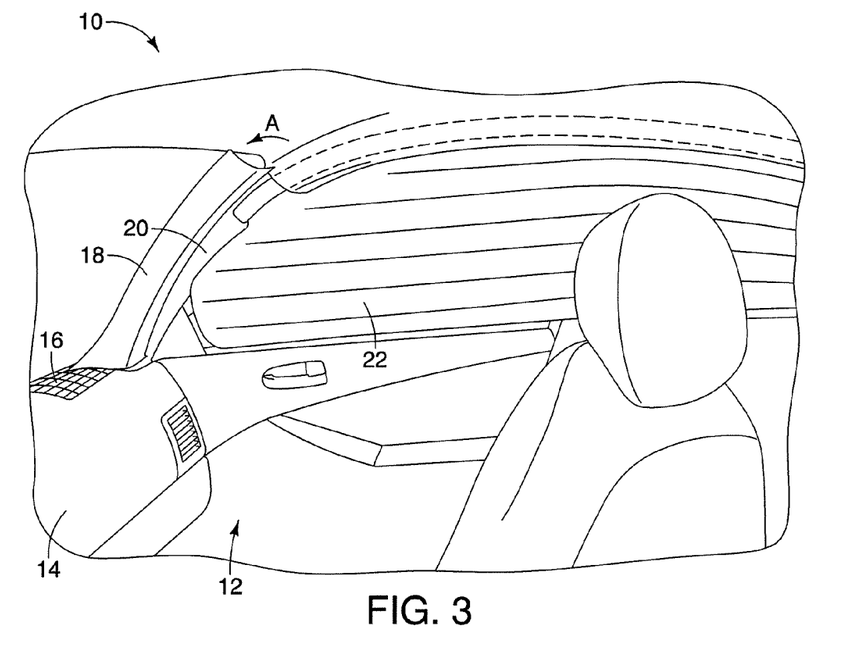
FIG. 3 is a perspective view of the interior portion of the vehicle illustrated in FIG. 1 with the airbag deployed and the vehicle interior trim panel in a detached position with respect to the A-pillar.
Figure 4:
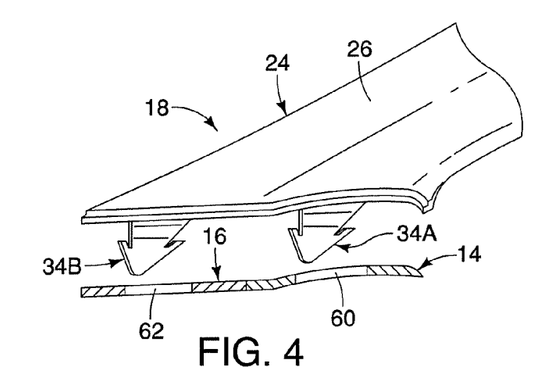
FIG. 4 is an enlarged interior side elevational view of the bottom end of the vehicle interior trim panel that includes tabs prior to insertion of the tabs into the vehicle component.
Figure 5:
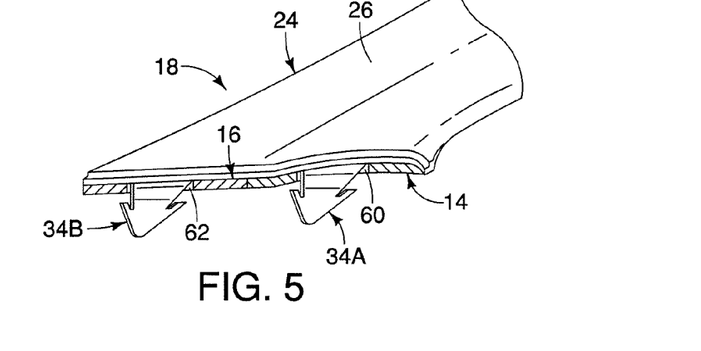
FIG. 5 is an enlarged interior side elevational view of the bottom end of the vehicle interior trim panel as shown in FIG. 4 after insertion of the tabs into the vehicle component.
Figure 6:
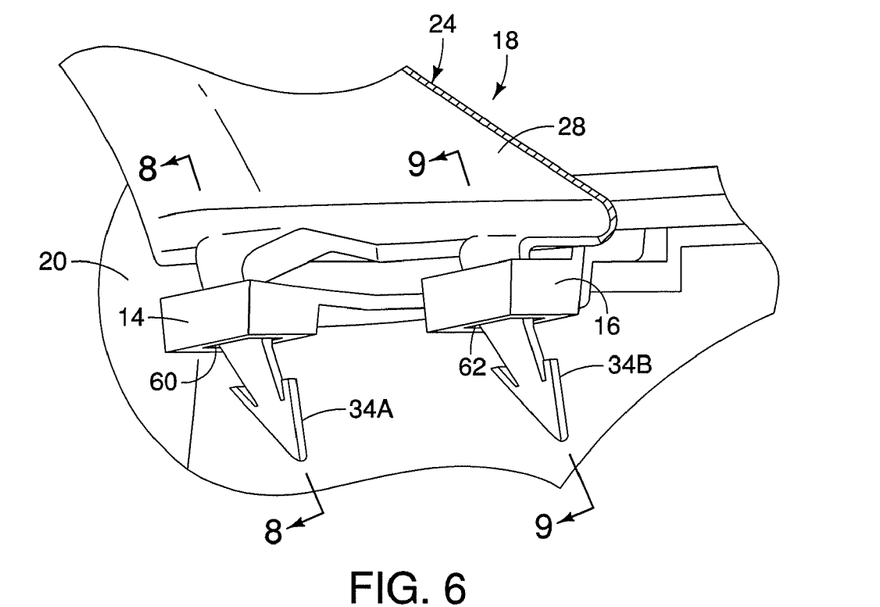
FIG. 6 is a perspective view of the bottom end of the vehicle interior trim panel connected to the vehicle component as seen from the underside of the vehicle component that shows the tabs of the vehicle interior trim panel inserted in the vehicle component when the vehicle interior trim panel is releasably secured to the vehicle pillar as shown in FIG. 1.

Referring initially to FIGS. 1 through 3, an interior portion of a vehicle 10 includes a vehicle body 12 that defines a passenger compartment. The vehicle body 12 has a dash board 14 (or instrument panel) and a pair of speaker grilles 16 (only the passenger's side is shown) disposed within the passenger compartment of the vehicle body 12. In this example, a pair of vehicle interior trim panels 18 in accordance with an illustrated embodiment are releasably secured to pillars 20 of the vehicle body 12 with bottom ends of the vehicle interior trim panels 18 being flushly disposed with portions of the dash board 14 and the speaker grilles 16. The vehicle interior trim panel 18 on the driver's side is a mirror image of the vehicle interior trim panel 18 on the passenger's side. Thus, the vehicle interior trim panel 18 on the driver's side is configured and arranged to cooperate with the driver's end of the dash board 14, the driver's side speaker grilles 16 and the driver's side pillar 20 in the same manner as the vehicle interior trim panel 18 on the passenger's side, which is discussed below in more detail. Thus, the following description of the vehicle interior trim panel 18 for passenger's side pillar 20 also applies to the vehicle interior trim panel 18 for the driver's side pillar 20.

The trim panel 18 can be made of plastic, composite or any suitable material as known in the art. An airbag 22 is disposed between the trim panel 18 and the pillar 20. The trim panel 18 is configured to overlay a portion of the pillar 20 and conceal the airbag 22. As shown in FIGS. 1 through 3, the pillar 20 is an A-pillar of the vehicle 10. Of course, the vehicle interior trim panel 18 can be employed in other areas of the vehicle 10. The trim panel 18 is releasably secured to the pillar 20 such that the trim panel 18 moves away from the pillar 20 in response to deployment of the concealed airbag 22.

As further shown in FIG. 3, the trim panel 18 is also configured to at least partially breakaway from the pillar 20 in response to deployment (inflation) of the airbag 22. In particular, the trim panel 18 moves away from the pillar 20 in a direction indicated by arrow A by a sufficient distance away from the pillar 20 to allow full deployment of the airbag 22.

Further details of the trim panel 18 are shown in FIGS. 3-15. As illustrated, the trim panel 18 includes a main trim body 24 having a passenger compartment facing surface 26 and a pillar facing surface 28. The passenger compartment facing surface 26 constitutes an exposed surface in that the passenger compartment facing surface 26 is visible from within the passenger compartment while the trim panel 18 is in its installed position. The pillar facing surface 28 constitutes a concealed surface in that the pillar facing surface 28 is not visible from within the passenger compartment while the trim panel 18 is in its installed position.

The main trim body 24 further includes a top edge 30 at the top end of the main trim body 24, a bottom edge 31 at the bottom end of the main trim body 24, a front peripheral edge 32 and a rear peripheral edge 33. In this example, two tabs 34A and 34B extend from the bottom end of the trim panel 18. In particular, the tabs 34A and 34B extend from the bottom edge 32 of the trim panel 18 to a free end that is configured to be received in a vehicle component. Thus, in this example, the first tab 34A and second tab 34B are spaced apart along the bottom edge 32 of the bottom end of the main trim body 24, and the first tab 34A is located closer to a rear peripheral edge 33 of the main trim body 24 than the second tab 34B.

In the illustrated embodiment, the tabs 34A and 34B are disposed in the dash board 14 and the speaker grille 16. However, the tabs 34A and 34B can be disposed in any suitable component as needed and/or desired in view of the vehicle configuration. Although this example illustrates two of the tabs 34A and 34B, the trim panel 18 can include a single tab 34A or 34B, or any suitable number of tabs 34A and 34B as needed and/or desired. The tabs 34A and 34B can be formed integrally with the main trim body 24 as a one-piece, unitary member such that the tabs 34A and 34B include the same material as the main trim body 24 as illustrated. Alternatively, the tabs 34A and 34B can be formed of the same material as the main trim body 24 or a different material, and secured to the main trim body 24 in any suitable manner, such as by snap-fitting, adhesive, one or more fasteners and so on.

In this example, each of the tabs 34A and 34B includes a first surface 36, a second surface 38 and a peripheral edge 40. The first surfaces 36 can be referred to as a first face of the tabs 34A and 34B, while the second surfaces 38 can be referred to as a second face of the tabs 34A and 34B. The peripheral edges 40 surrounds the first and second surfaces 36 and 38 (first and second faces), respectively, and define the outer peripheries of the tabs 34A and 34B. In this example, the first surfaces 36 are located on the same sides of the tabs 34A and 34B as the pillar facing surface 28, and can be considered to correspond to the pillar facing surface 28 of the main trim body 24. Also, the second surfaces 38 can be considered to correspond to the passenger compartment facing surface 26 of the main trim body 24.

The peripheral edge 40 of each of the tabs 34A and 34B includes a first side edge 42, a second side edge 44 and a bottom edge 46 as illustrated. In this example, the bottom edge 46 is at the free end of the tabs 34A and 34B, and can also be described as free end edge 46. Each of the tabs 34A and 34B further includes retention members 48 that are formed on the peripheral edge 40 of the tabs 34A and 34B. In this example, retention members 48 extend from the first and second side edges 42 and 44. As discussed in more detail below, the retention members 48 are configured to retain the tabs 34A and 34B to the vehicle component while the main trim body 24 is released from the pillar 20.

Although this example illustrates two retention members 48 extending from each of the tabs 34A and 34B, the tabs 34A and 34B can include a single retention member 48, or any suitable number of retention members 48 as needed and/or desired. Each retention member 48 can be formed integrally with the tabs 34A and 34B as a one-piece, unitary member such that the retention member 48 includes the same material as the tabs 34A and 34B as illustrated. Alternatively, a retention member 48 can be formed of the same material as the tabs 34A and 34B or a different material, and secured to the tabs 34A and 34B in any suitable manner, such as by snap-fitting, adhesive, one or more fasteners and so on.

As further shown, each retention member 48 includes a retention surface 50 and a ramp surface 52. The retention surface 50 faces in a direction generally towards the top end 30 of the main trim body 24. The retention surface 50 of the retention members 48 can extend parallel or substantially parallel with the free end edge 46 of the tabs 34A and 34B. The ramp surface 52 extends from the retention surface 50 to the peripheral edge 40 such that the ramp surface 52 is tapered toward the peripheral edge 40 of the tabs 34A and 34B as the ramp surface 52 approaches the free end edge 46 of the tabs 34A and 34B. In this example, the ramp surface 52 ends at the free end edge 46 of tabs 34A and 34B. Alternatively, the ramp surface 52 can end at a location that is spaced from the free end edge 46 of tabs 34A and 34B. In addition, each tab 34A and 34B defines a recess 54 between the peripheral edge 40 of the tab 34A and 34B and the retention members 48 such that at least a portion of the retention member 48 is deflectably arranged with respect to the peripheral edge 40 of the tabs 34A and 34B.

As will now be discussed, the retention members 48 are configured to retain the tabs 34A and 34B to the vehicle component (e.g., the dash board 14 or the speaker grille 16) while the main trim body 24 is released from the pillar 20. In this example which includes two tabs 34A and 34B, one of the tabs 34A can be referred to simply as a tab 34A or a first tab 34A, and the other tab 34B can be referred to as an additional or second tab 34B. The first and second tabs 34A and 34B are spaced apart along the bottom end of the main trim body 24, with the first tab 34A being located closer to the rear peripheral edge 33 of the main trim body 24 than the second tab 34B as shown. It should also be noted that the one of the retention members 48 of the first tab 34A can be larger in size than the other of the retention members 48 of the first tab 34A, and one or both of the retention members 48 of the first tab 34A can be larger than one or both of the retention members 48 of the second tab 34B, or vice-versa.

Figure 11:
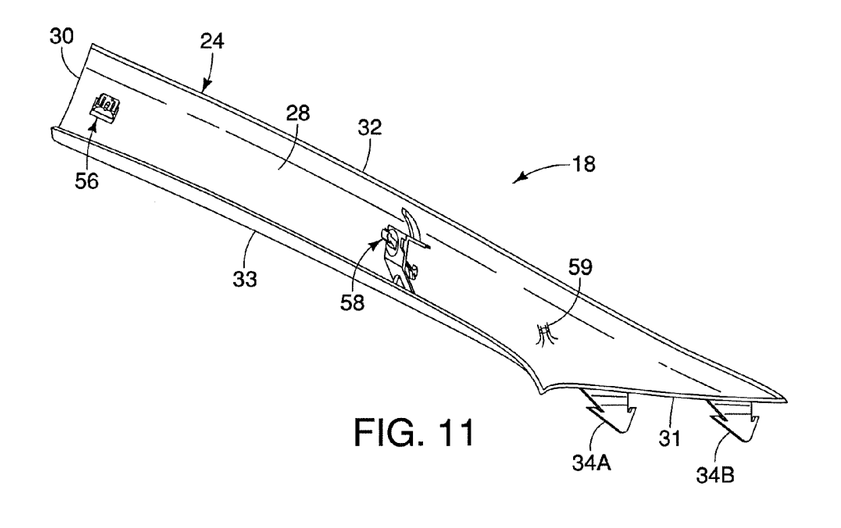
FIG. 11 is a concealed side elevational view of the vehicle interior trim panel showing the pillar facing surface.
Figure 12:
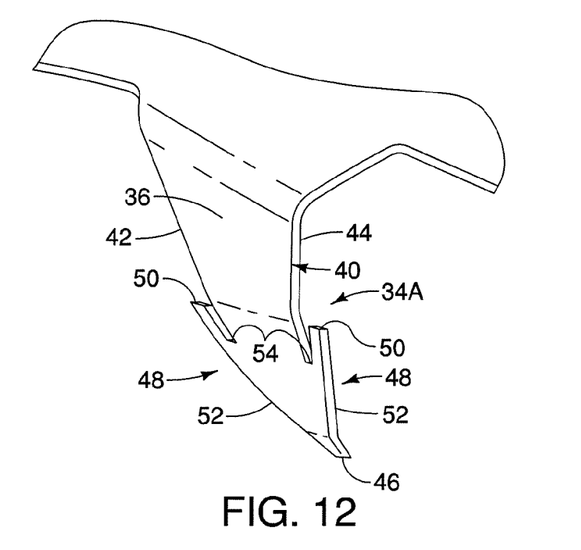
FIG. 12 is an enlarged perspective view of one of the tabs and retention members of the vehicle interior trim panel as viewed from the pillar facing surface of the vehicle interior trim panel.
Figure 13:
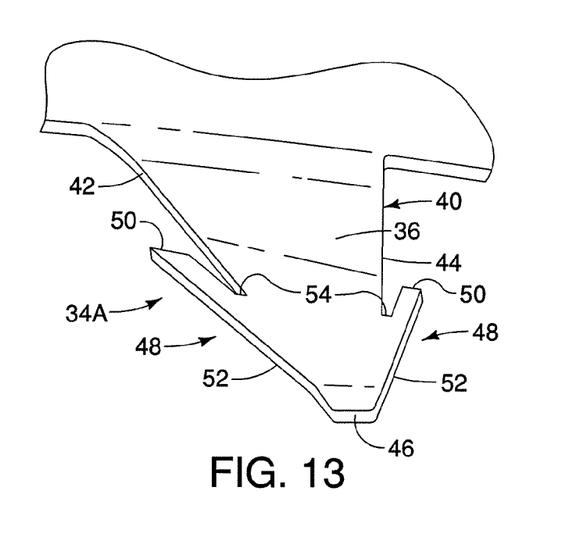
FIG. 13 is an enlarged pillar facing side view of one of the tabs and retention members of the vehicle interior trim panel as viewed from the pillar facing surface of the vehicle interior trim panel.
Figure 14:
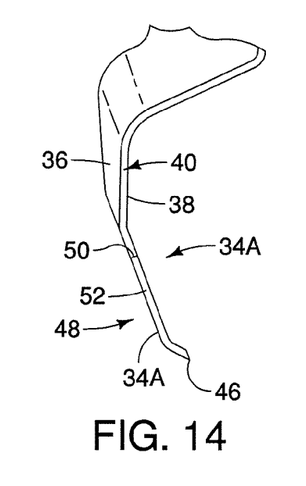
FIG. 14 is an enlarged side view of one of the tabs and retention members of the vehicle interior trim panel as viewed from the right side in FIG. 13.
Figure 15:
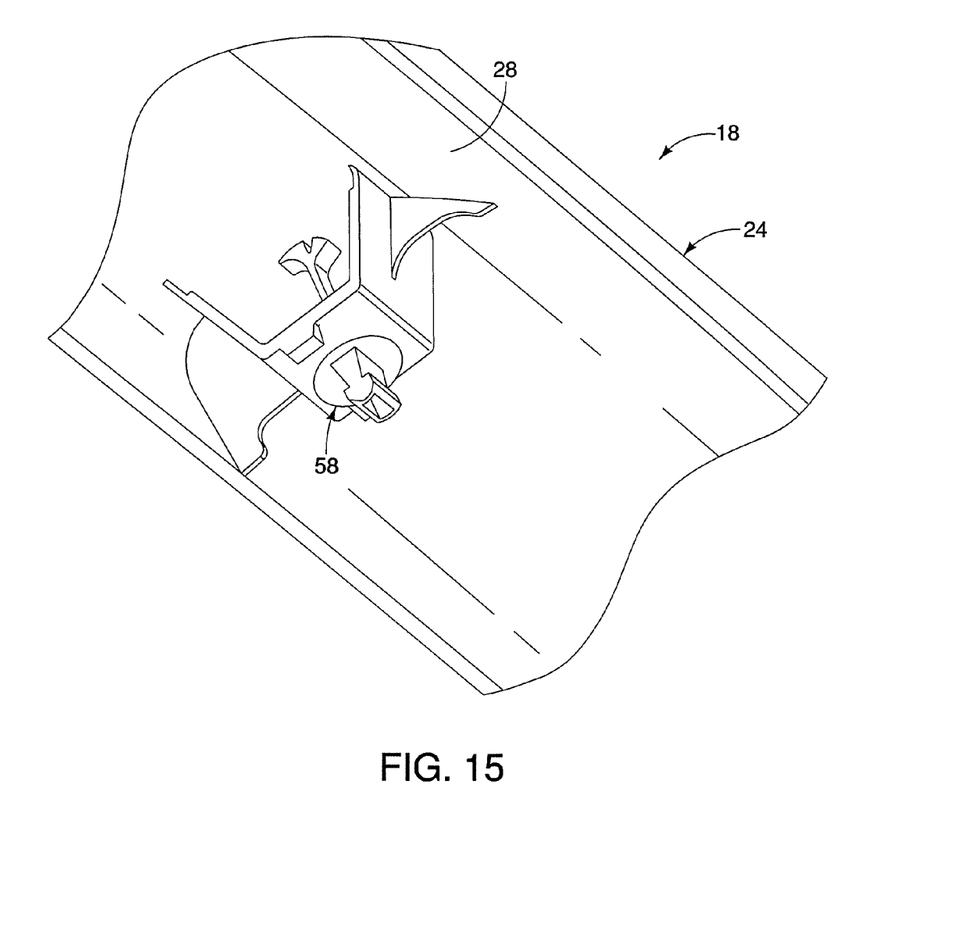
FIG. 15 is an enlarged perspective view of a portion of the vehicle interior trim panel that includes the integrated trim clip and tether for connecting the vehicle interior trim panel to the vehicle pillar.

As further shown in FIGS. 11 and 15, the trim panel 18 also includes a one-stage clip structure 56, a two-stage clip structure 58, and one or more locating structures 59 disposed on the pillar facing surface 28 of the main trim body 24. However, the trim panel 18 can be constructed with no locating structures 59, or only one or the other of the clip structures 56 and 58, as well as various combinations of several clip structures 56 and 58 and locating structures 59, as needed and/or desired. In this example, the pillar facing surface 28 of the main trim body 24 includes at least a one-stage fastening clip 56 located proximate to the top end of the main trim body 24, a two-stage fastening clip 58 located between the one-stage fastening clip and the bottom end of the main trim body 24, and a locating structure 59 located between the two-stage fastening clip 58 and the bottom end of the main trim body 24 The locating structure 59 assists in positioning the trim panel 18 to the pillar 20, and the one-stage clip structure 56 and the two-stage clip structure 58 releasably and retainably secure the trim panel 18 to the pillar 20 in a conventional manner as understood in the automotive field.

That is, during installation of the trim panel 18 over the pillar 20, the tabs 34A and 34B pass through apertures in the dash board 14 and the speaker grille 16. In this example, as shown in FIGS. 4-9, one of the tabs 34A passes through an aperture 60 in the dash board 14 and the other tab 34B passes through an aperture 62 in the speaker grille 16. Naturally, the apertures 60 and 62 need not be provided in the dash board 14 and speaker grille 16, respectively, but rather, both apertures 60 and 62 can be provided in the dash board 14, in the speaker grille 16, or in any other suitable component of the vehicle 10. Furthermore, different numbers of apertures can be present to accommodate different numbers of tabs 34A and 34B.

As the tabs 34A and 34B are being inserted into the respective apertures 60 and 62, the retention members 48 (e.g., the ramp surfaces 52) guide the tabs 34A and 34B into the respective apertures 60 and 62 and thus facilitate installation of the tabs 34A and 34B into the respective apertures 60 and 62. As can be understood in the art, at least a portion of the retention members 48 flexes inwardly into recesses 54 as the retention members 48 contact the respective edges 64 and 66 of the dash board 14 and speaker grille 16 while the tabs 34A and 34B are being inserted into the respective apertures 60 and 62. Once the retention surfaces 50 of the retention members 48 pass beyond the respective edges 64 and 66, the flexed portions of the retention members 48 flex back to their relaxed position. As a result, the retention surfaces 50 contact the respective concealed surfaces 68 and 70 of the dash board 14 and the speaker grille 16, thus providing a snap-fit connection between the tabs 34A and 34B, the dash board 14 and the speaker grille 16.

The one-stage clip structure 56, the two-stage clip structure 58 and the locating structure 59 couple to corresponding structures on, for example, the pillar 20 in a manner as understood in the art. Accordingly, the arrangement of the tabs 34A and 34B, apertures 60 and 62, one-stage clip structure 56, two-stage clip structure 58 and locating structure 59 maintain a suitable fit and finish of the trim panel 18 over the pillar 20 and with respect to the exposed surface 72 of the dash board 14 and the exposed surface 74 of the speaker grille 16.

Figure 7:
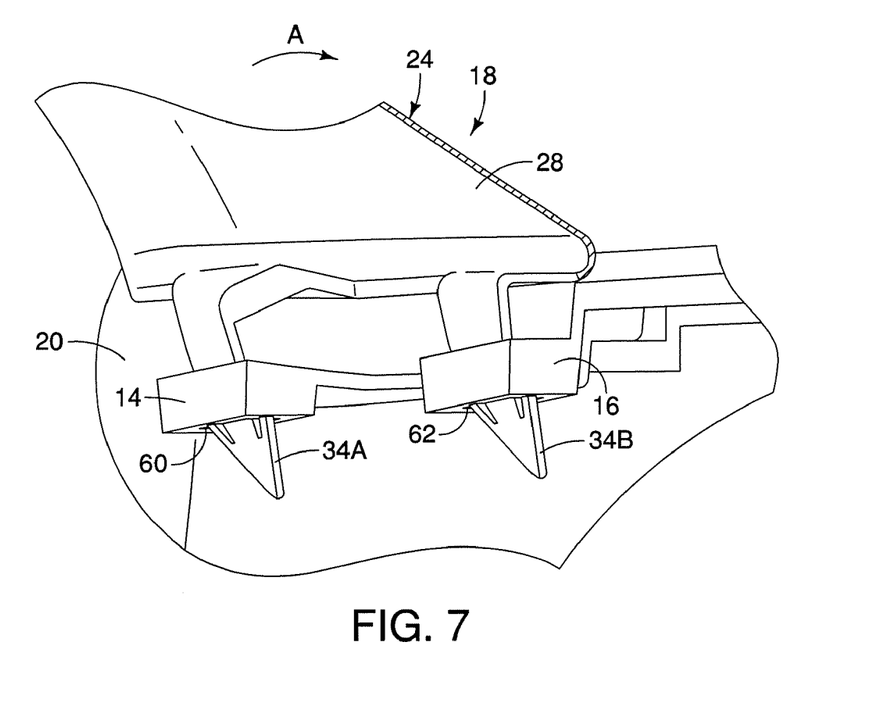
FIG. 7 is a perspective view of the bottom end of the vehicle interior trim panel and connected to the vehicle component as seen from the underside of the vehicle component that shows the retention members of the tabs of the vehicle interior trim panel engaging the vehicle component when the vehicle interior trim panel is released from the vehicle pillar as shown in FIG. 3.
Figure 8:
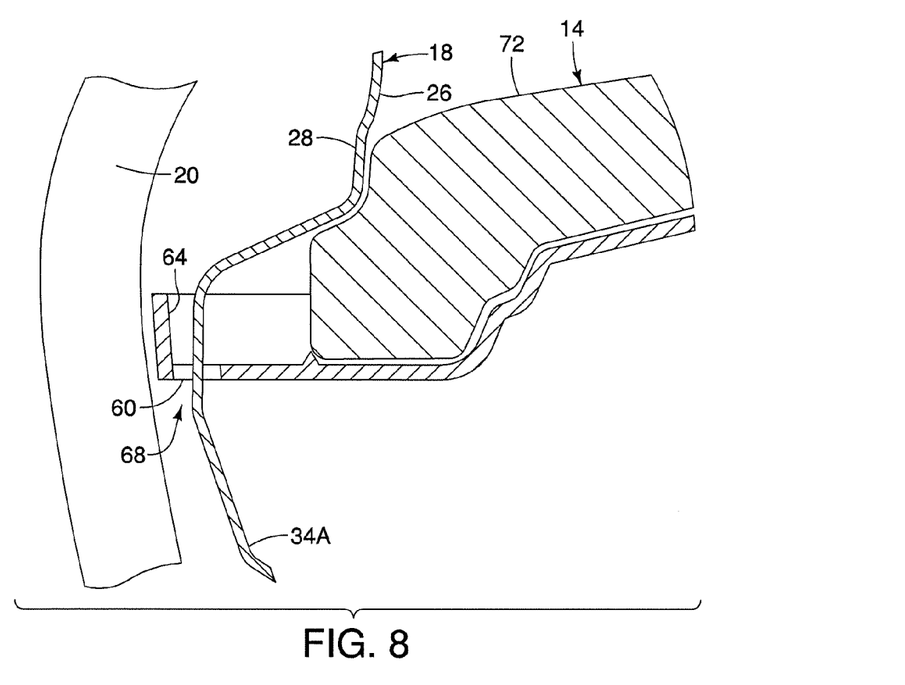
FIG. 8 is a cross sectional view of the bottom end of the vehicle interior trim panel and the vehicle component taken along section lines 8-8 in FIG. 6.
Figure 9:
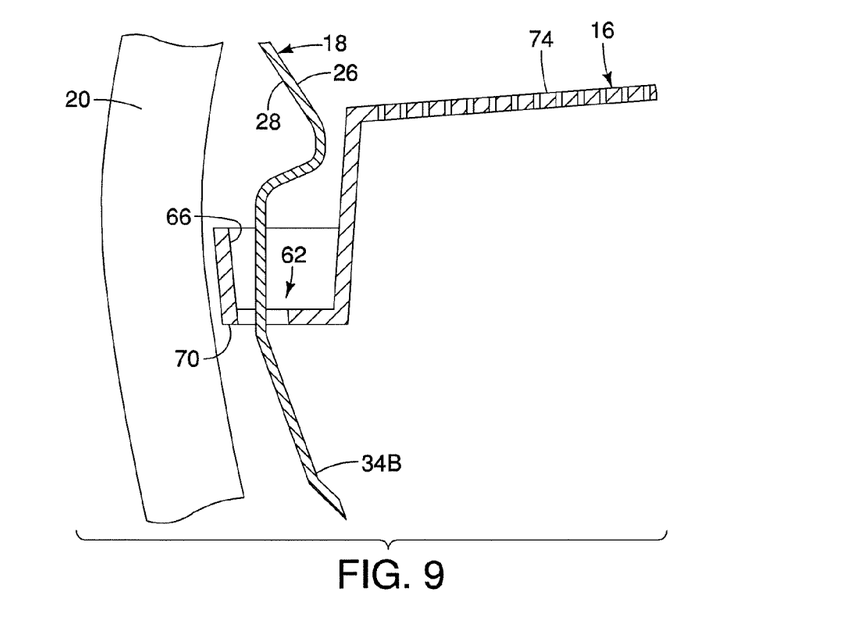
FIG. 9 is a cross sectional view of the bottom end of the vehicle interior trim panel and the vehicle component taken along section lines 9-9 in FIG. 6.
Figure 10:
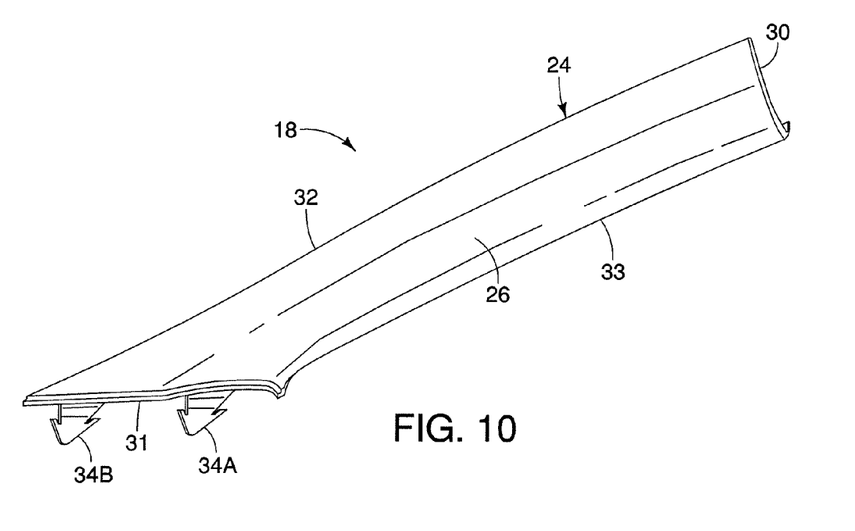
FIG. 10 is an interior side elevational view of the vehicle interior trim panel showing the passenger compartment facing surface.

Furthermore, the retention surfaces 50 of the retention members 48 act as retention surfaces to retain the tabs 34A and 34B in the apertures 60 and 62 when the airbag 22 is deployed. That is, as shown in FIGS. 3 and 7, when the airbag is deployed, the force of the deployment causes the trim panel 18 to release from the pillar 20. As this occurs, the trim panel 18 can move or pivot about the area of engagement of the tabs 34A and 34B and edges 64 and 66 of corresponding apertures 60 and 62. That is, the trim panel 18 is configured to pivot relative to the vehicle component (e.g., the dash board 14, speaker grille 16 or any other suitable component) to allow deployment of the airbag 20. The pivot axis about which the trim panel 18 pivots can be formed by either the second surfaces 38 of the tabs 34A and 34B, the bottom edge 32 of the main trim body 24, or the passenger compartment facing surface 26 of the main trim body 24, contacting the exposed surface of the vehicle component (e.g., the exposed surface 72 of the dash board 14 or the exposed surface 74 of the speaker grille 16) and rotating about that point of contact. This movement or pivoting can cause the tabs 34A and 34B to move in a direction outward of the apertures 60 and 62. However, as shown in FIG. 7, the retention surfaces 50, in particular, of the retention members 48 contact the concealed surfaces 68 and 70 of the dash board 14 and speaker grille 16, respectively, and thus retain the tabs 34A and 34B in the apertures 60 and 62. Thus, the vehicle component (e.g., dash board 14, speaker grille 16 or any other suitable component) includes a concealed surface, and the retention surface of the retention member contacts the concealed surface of the vehicle component to prevent movement of the tabs 34A and 34B out of the apertures 60 and 62. In other words, the trim panel 18 is pivotally arranged relative to the vehicle component by the second surfaces 38 of the tabs 34A and 34B contacting the vehicle component during deployment of the airbag 20. Accordingly, the retention members 48 prevent the tabs 34A and 34B from exiting the apertures 60 and 62 during airbag deployment.

On the other hand, if it is desirable to remove the trim panel 18 from the dash board 14 and speaker grille 16 in this example, a tool can be inserted into apertures 60 and 62 to deflect the deflectable portions of the retention members 48 into their respective recesses 54 and away from the concealed surfaces 68 and 70 of the dash board 14 and the speaker grille 16. In this deflected position, the retention surfaces 50 of the retention members 48 will no longer secure the tabs 34A and 34B in the apertures 60 and 62 and accordingly, the tabs 34A and 34B can be removed from the openings when the trim panel 18 is removed from the dash board 14 and the speaker grille 16.

Figure 16:
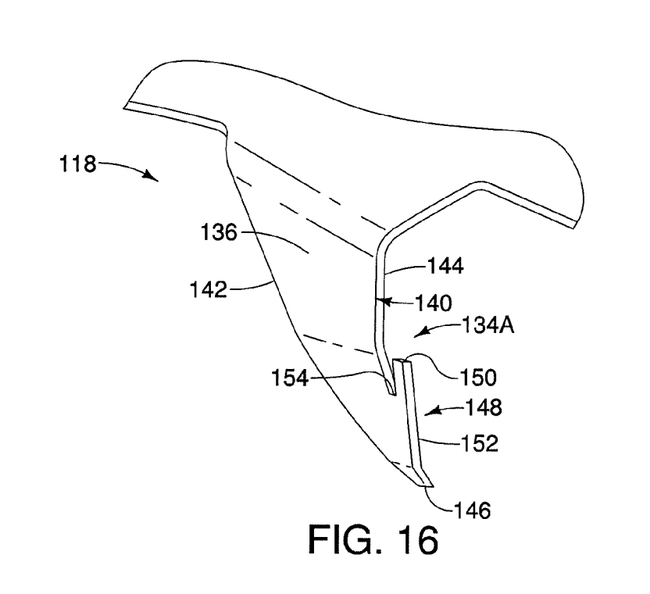
FIG. 16 is an enlarged perspective view of one of the tabs and retention members of the vehicle interior trim panel according to another disclosed embodiment as viewed from the pillar facing surface of the vehicle interior trim panel.
Figure 17:
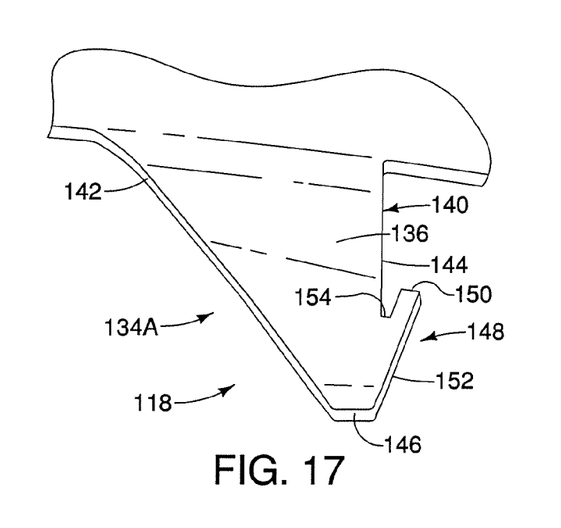
FIG. 17 is an enlarged pillar facing side view of one of the tabs and retention members of the vehicle interior trim panel shown in FIG. 16 as viewed from the pillar facing surface of the vehicle interior trim panel.
Figure 18:
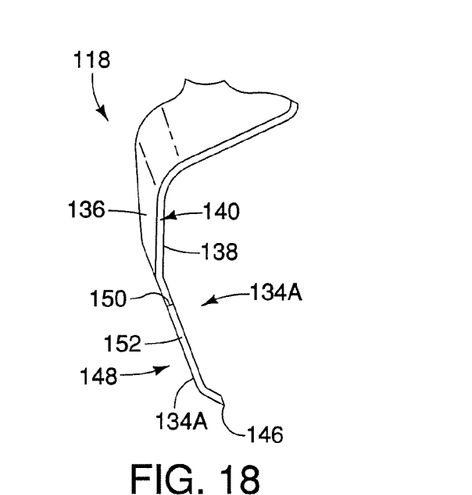
FIG. 18 is an enlarged side view of one of the tabs and retention members of the vehicle interior trim panel as viewed from the right side in FIG. 17

Referring now FIGS. 16 to 18, a bottom portion of a vehicle interior trim panel 118 is illustrated in accordance with another embodiment. In this example, the vehicle interior trim panel 118 is identical to the vehicle interior trim panel 18 discussed above, except that the tabs 134 include one retention member 148 configured in a manner similar to retention member 48 as discussed above. In this example, the single retention member 148 projects from the second side edge 144 of the peripheral edge 140 of each of the tabs 134. However, the single retention member 148 can instead project from the first side edge 142 of the tabs 134, or can project from the first side edge 142 of one of the tabs 134 and the second side edge 144 of the other tab 134.

Thus, the tabs 134 of the trim panel 118 cooperate with the dash board 14 and speaker grille 16 in the same or substantially the same manner as discussed above with respect to the trim panel 18. Also, the trim panel 118 is installed on the pillar 20 in the same manner as discussed above with respect to the trim panel 18. Furthermore, the retention surface 150 of the retention member 148 operates in a manner similar to retention surface 50 to prevent the tabs 134 from exiting the apertures 60 and 62 during airbag deployment as discussed above.

That is, at least a portion of the retention members 148 flexes inwardly into recesses 154 as the retention members 148 contact the respective edges 64 and 66 of the dash board 14 and speaker grille 16 (as shown in, for example, FIGS. 8 and 9) while the tabs 134 are being inserted into the respective apertures 60 and 62. Once the retention surfaces 150 of the retention members 148 pass beyond the respective edges 64 and 66, the flexed portions of the retention members 148 flex back to their relaxed position. As a result, the retention surfaces 150 contact the respective concealed surfaces 68 and 70 of the dash board 14 and the speaker grille 16, thus providing a snap-fit connection between the tabs 134, the dash board 14 and the speaker grille 16. Accordingly, the retention members 148 prevent the tabs 134 from exiting the apertures 60 and 62 during airbag deployment.

If it is desirable to remove the trim panel 118 from the dash board 14 and speaker grille 16 in this example, a tool can be inserted into apertures 60 and 62 to deflect the deflectable portions of the retention members 148 into their respective recesses 154 and away from the concealed surfaces 68 and 70 of the dash board 14 and the speaker grille 16 as discussed above with regard to retention members 48. In this deflected position, the retention surfaces 150 of the retention members 148 will no longer secure the tabs 134 in the apertures 60 and 62 and accordingly, the tabs 134 can be removed from the openings when the trim panel 118 is removed from the dash board 14 and the speaker grille 16.

Figure 19:
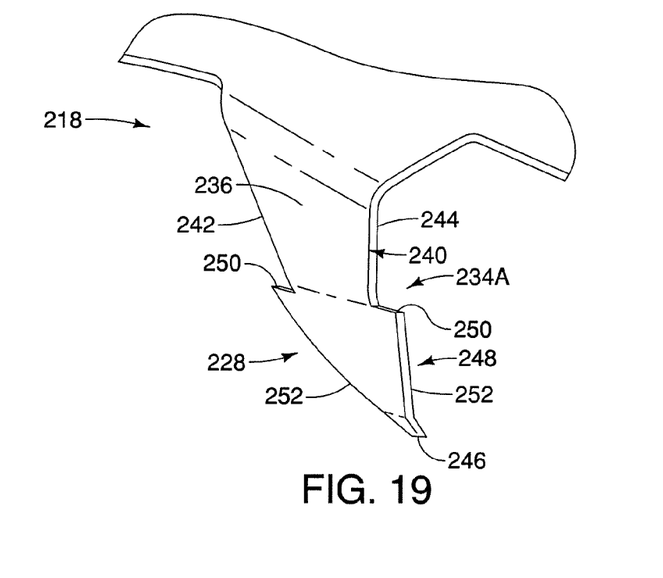
FIG. 19 is an enlarged perspective view of one of the tabs and retention members of the vehicle interior trim panel according to another disclosed embodiment as viewed from the pillar facing surface of the vehicle interior trim panel.
Figures 20, 21:
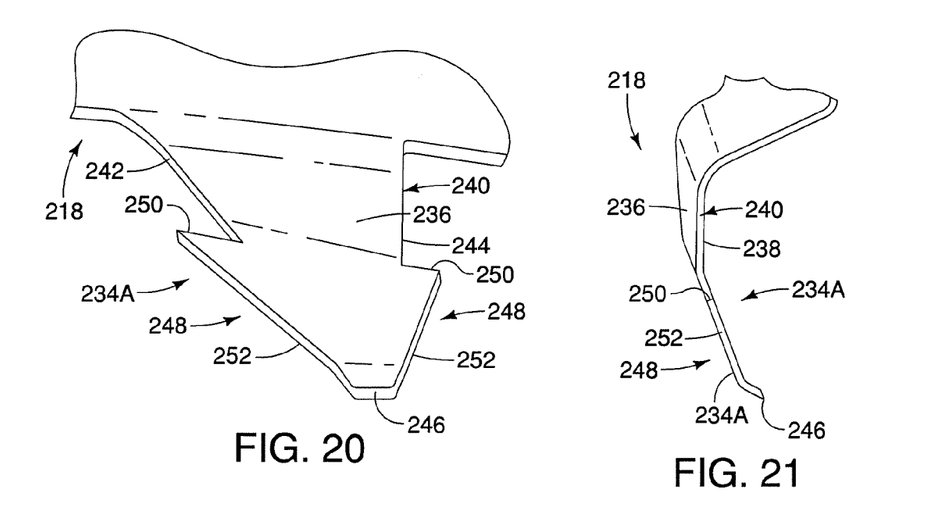
FIG. 20 is an enlarged pillar facing side view of one of the tabs and retention members of the vehicle interior trim panel shown in FIG. 19 as viewed from the pillar facing surface of the vehicle interior trim panel.
FIG. 21 is an enlarged side view of one of the tabs and retention members of the vehicle interior trim panel as viewed from the right side in FIG. 20.

Referring now FIGS. 19 to 21, a bottom portion of a vehicle interior trim panel 218 is illustrated in accordance with another embodiment. In this example, the vehicle interior trim panel 218 is identical to the vehicle interior trim panel 18 discussed above, except that the tabs 234 include retention member 248 configured in a manner similar to retention member 48 as discussed above, except for the recesses 54. That is, each retention member 248 in this example includes a retention surface 250 and a ramp surface 252. As with retention surface 50 discussed above, the retention surface 250 faces in a direction generally towards the top end of the main trim body of vehicle interior trim panel 218. The retention surface 250 of the retention members 248 can extend parallel or substantially parallel with the free end edge 246 of the tabs 234. The ramp surface 252 extends from the retention surface 250 to the peripheral edge 240 such that the ramp surface 252 is tapered toward the peripheral edge 240 of the tabs 134 as the ramp surface 252 approaches the free end of the tabs 234. In this example, the ramp surface 252 ends at the free end edge 246 of tabs 34A and 34B. Alternatively, the ramp surface 252 can end at a location that is spaced from the free end 246 of tabs 234.

As with tabs 34A, 34B and 134 discussed above, the tabs 234 of the trim panel 218 cooperate with the openings 60 and 62 in the dash board 14 and speaker grille 16, respectively. Also, the trim panel 218 is installed on the pillar 20 as discussed above with respect to the trim panels 18 and 118. Furthermore, the retention surface 250 of the retention member 248 operates in a manner similar to retention surface 50 to prevent the tabs 234 from exiting the apertures 60 and 62 during airbag deployment as discussed above.

However, unlike retention members 48 and 148, retention members 248 fail to include recesses similar to recesses 54 or 154. Hence, the retention members 248 are more rigid than retention members 48 and 148. Nevertheless, the retention members 248 can compress when coming in contact the respective edges 64 and 66 of the dash board 14 and speaker grille 16 while the tabs 234 are being inserted into the respective apertures 60 and 62, so that the tabs 234 and retention members 248 can pass through the apertures 60 and 62. Also, the apertures 60 and 62 may need to be made larger to accommodate the retention members 248. Once the retention surfaces 250 of the retention members 248 pass beyond the respective edges 64 and 66 defining apertures 60 and 62, the retention members 248 return to their relaxed position. As a result, the retention surfaces 250 contact the respective concealed surfaces 68 and 70 of the dash board 14 and the speaker grille 16, thus providing a snap-fit connection between the tabs 234, the dash board 14 and the speaker grille 16. Accordingly, the retention members 248 prevent the tabs 234 from exiting the apertures 60 and 62 during airbag deployment.

If it is desirable to remove the trim panel 218 from the dash board 14 and speaker grille 16 in this example, a tool can be inserted into apertures 60 and 62 to attempt to compress the retention members 248 so that the retention members 248 and tabs 234 can pass through the apertures 60 and 62. However, in this arrangement, removal of the tabs 234 is generally more difficult than in the arrangements discussed above due to the absence of recesses 54 or 154. Also, the retention members 248 may cause some deformation or damage to the edges 64 and 66 defining the apertures 60 and 62, or the retention members 248 themselves may be deformed or damaged, when the tabs 234 are being removed.

Figure 22:
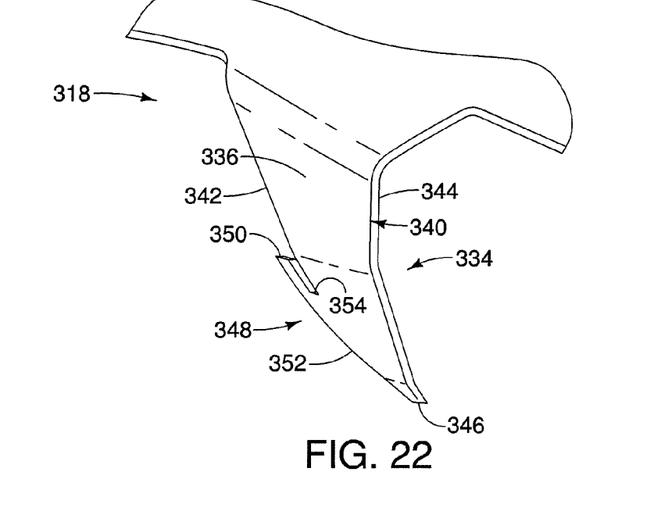
FIG. 22 is an enlarged perspective view of one of the tabs and retention members of the vehicle interior trim panel according to another disclosed embodiment as viewed from the pillar facing surface of the vehicle interior trim panel.
Figure 23:
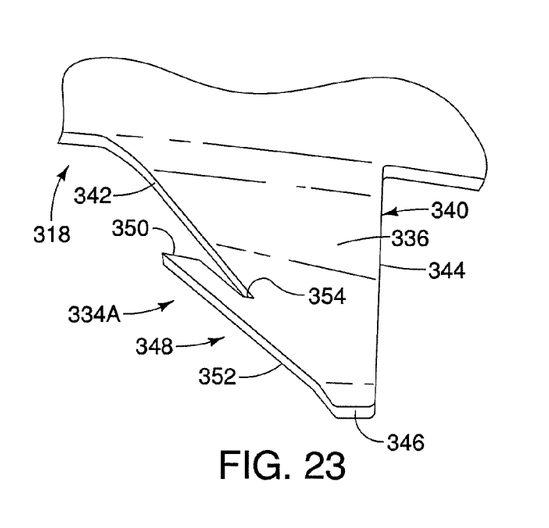
FIG. 23 is an enlarged pillar facing side view of one of the tabs and retention members of the vehicle interior trim panel shown in FIG. 22 as viewed from the pillar facing surface of the vehicle interior trim panel.
Figure 24:
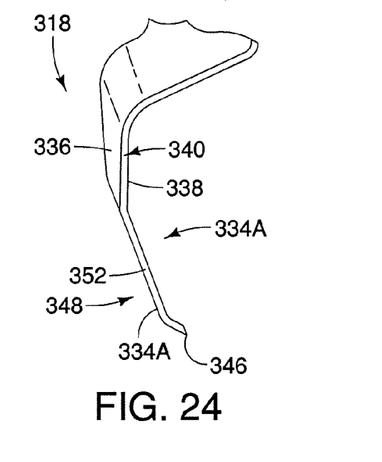
FIG. 24 is an enlarged side view of one of the tabs and retention members of the vehicle interior trim panel as viewed from the right side in FIG. 23.

Referring now FIGS. 22 to 24, a bottom portion of a vehicle interior trim panel 318 is illustrated in accordance with another embodiment. In this example, the vehicle interior trim panel 318 is identical to the vehicle interior trim panel 218 discussed above, except that the tabs 334 include one retention member 348 configured in a manner similar to retention member 248 as discussed above. In this example, the single retention member 348 projects from the first side edge 342 of the peripheral edge 340 of each of the tabs 334. However, the single retention member 348 can instead project from the second side edge 344 of the tabs 334, or can project from the first side edge 342 of one of the tabs 334 and the second side edge 344 of the other tab 334. Accordingly, the retention members 348 prevent the tabs 334 from exiting the apertures 60 and 62 during airbag deployment as discussed above with regard to tabs 234.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle interior trim panel. Accordingly, these terms, as utilized to describe the present invention should be interpreted relative to a vehicle equipped with the vehicle interior trim panel. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments of the present invention are provided for illustration only, and not for the purpose of limiting the invention as defined by the appended claims and their equivalents.

What is claimed is:

1. A vehicle interior pillar trim panel comprising:
a main trim body configured to releasably cover at least a portion of a pillar of a vehicle, the main trim body including a pillar facing surface, a passenger compartment facing surface, a top end and a bottom end; and
a tab extending from the bottom end of the main trim body to a free end and configured to be received in a vehicle component, the tab including a first face corresponding to the pillar facing surface of the main trim body, a second face corresponding to the passenger compartment facing surface of the main trim body, a peripheral edge surrounding the first and second faces of the tab, and a retention member formed on the peripheral edge of the tab, the retention member being configured to retain the tab to the vehicle component while the main trim body is released from the pillar, the retention member including a retention surface that faces in a direction generally towards the top end of the main trim body.

2. The vehicle interior pillar trim panel according to claim 1, wherein
the tab defines a recess between the peripheral edge of the tab and the retention member such that at least a portion of the retention member is deflectably arranged with respect to the peripheral edge of the tab.

3. A vehicle interior pillar trim panel comprising:
a main trim body configured to releasably cover at least a portion of a pillar of a vehicle, the main trim body including a pillar facing surface, a passenger compartment facing surface, a top end and a bottom end; and
a tab extending from the bottom end of the main trim body to a free end and configured to be received in a vehicle component, the tab including a first face corresponding to the pillar facing surface of the main trim body, a second face corresponding to the passenger compartment facing surface of the main trim body, a peripheral edge surrounding the first and second faces of the tab, and a retention member formed on the peripheral edge of the tab, the retention member being configured to retain the tab to the vehicle component while the main trim body is released from the pillar, the retention member including a retention surface and a ramp surface with the ramp surface extending from the retention surface to the peripheral edge such that the ramp surface is tapered toward the peripheral edge of the tab as the ramp surface approaches the free end of the tab.

4. The vehicle interior pillar trim panel according to claim 3, wherein
the ramp surface ends at the free end of the tab.

5. The vehicle interior pillar trim panel according to claim 3, wherein
the ramp surface ends at a location that is spaced from the free end of the tab.

6. The vehicle interior pillar trim panel according to claim 1, wherein
the peripheral edge includes a first side edge, a second side edge, and a free end edge, and the retention member is formed on the first side edge.

7. The vehicle interior pillar trim panel according to claim 6, wherein
the tab includes an additional retention member formed on the second side edge.

8. The vehicle interior pillar trim panel according to claim 7, wherein
the additional retention member includes a retention surface, and each of the retention members includes a ramp surface, with the ramp surfaces extending from a corresponding one of the retention surfaces towards the free end edge.

9. The vehicle interior pillar trim panel according to claim 1, further comprising
at least one additional tab extending from the bottom end of the main trim body and including a retention member.

10. The vehicle interior pillar trim panel according to claim 1, wherein
the tabs include a first tab and a second tab, with the first and second tabs spaced apart along the bottom end of the main trim body and the first tab being located closer to a rear peripheral edge of the main trim body than the second tab.

11. A vehicle structure comprising:
a pillar;
an vehicle component defining an aperture; and
a vehicle interior pillar trim panel releasably coupled to the pillar, the pillar trim panel including
a main trim body including a pillar facing surface, a passenger compartment facing surface, a top end and a bottom end, and
a tab extending from the bottom end of the main trim body to a free end, the tab extending through the aperture of the vehicle component, the tab including a first face corresponding to the pillar facing surface of the main trim body, a second face corresponding to the passenger compartment facing surface of the main trim body, a peripheral edge surrounding the first and second faces of the tab, the tab further including a retention member formed on the peripheral edge of the tab, the retention member selectively retaining the tab to the vehicle component while the main trim body is released from the pillar and including a retention surface that faces in a direction generally towards the top end of the main trim body.

12. The vehicle structure according to claim 11, wherein
the vehicle component includes a concealed surface, and the retention surface contacts the concealed surface of the vehicle component to prevent movement of the tab out of the aperture.

13. A vehicle structure comprising:
a pillar;
an vehicle component defining an aperture; and
a vehicle interior pillar trim panel releasably coupled to the pillar, the pillar trim panel including
a main trim body including a pillar facing surface, a passenger compartment facing surface, a top end and a bottom end, and
a tab extending from the bottom end of the main trim body to a free end, the tab extending through the aperture of the vehicle component, the tab including a first face corresponding to the pillar facing surface of the main trim body, a second face corresponding to the passenger compartment facing surface of the main trim body, a peripheral edge surrounding the first and second faces of the tab, the tab further including a retention member formed on the peripheral edge of the tab, the retention member selectively retaining the tab to the vehicle component while the main trim body is released from the pillar and including a retention surface and a ramp surface extending from the retention surface toward the free end of the tab such that the ramp surface is tapered to guide installation of the tab through the aperture.

14. The vehicle structure according to claim 11, further comprising
an airbag disposed between the pillar and the vehicle interior trim panel, the retention member engaging the vehicle component to maintain the tab within the aperture during deployment of the airbag.

15. The vehicle structure according to claim 11, wherein
the tab defines a recess between the peripheral edge of the tab and the retention member such that at least a portion of the retention member is deflectably arranged with respect to the peripheral edge of the tab.

16. The vehicle structure according to claim 11, wherein
the tab includes an additional retention member formed on the peripheral edge.

17. The vehicle structure according to claim 11, further comprising
at least one additional tab extending from the bottom end of the main trim body and including a retention member.

18. The vehicle structure according to claim 13, wherein
the ramp surface ends at the free end of the tab.

19. The vehicle interior pillar trim panel according to claim 1, wherein
the retention member further includes a ramp surface with the ramp surface extending from the retention surface to the peripheral edge such that the ramp surface is tapered toward the peripheral edge of the tab as the ramp surface approaches the free end of the tab.

20. The vehicle structure according to claim 11, wherein
the retention member further includes a ramp surface extending from the retention surface toward the free end of the tab such that the ramp surface is tapered to guide installation of the tab through the aperture.

* * * * *